(12) United States Patent
Woodruff

(10) Patent No.: US 6,758,314 B2
(45) Date of Patent: Jul. 6, 2004

(54) PORTABLE LIGHT REEL SYSTEM

(76) Inventor: George Woodruff, 210 S. Washington Ave., Titusville, FL (US) 32796

( * ) Notice: Subject to any disclaimer, the term of this patent is extended or adjusted under 35 U.S.C. 154(b) by 0 days.

(21) Appl. No.: 10/406,448

(22) Filed: Apr. 4, 2003

(65) Prior Publication Data

US 2004/0084271 A1 May 6, 2004

Related U.S. Application Data

(60) Provisional application No. 60/422,718, filed on Oct. 31, 2002.

(51) Int. Cl.[7] .............................................. B65H 75/00
(52) U.S. Cl. ................................ 191/12.2 R; 242/398; 242/395
(58) Field of Search ......................... 191/12 R, 12.2 R, 191/12.4, 12.2 A, 12 S; 242/370, 398, 395, 405

(56) References Cited

U.S. PATENT DOCUMENTS

| | | |
|---|---|---|
| 3,835,267 A | 9/1974 | Sharpe |
| 3,837,448 A | 9/1974 | Hagstrom |
| 4,143,746 A | 3/1979 | Lowery |
| 4,244,536 A | 1/1981 | Harrill |
| 4,284,180 A | 8/1981 | Masters |
| 4,721,833 A | 1/1988 | Dubay |
| 4,842,108 A * | 6/1989 | Anderson et al. ........ 191/12.2 A |
| 4,893,037 A * | 1/1990 | Schwartz ................... 310/68 B |
| 5,695,148 A | 12/1997 | Christensen |
| 5,957,401 A | 9/1999 | O'Donnell |
| 6,035,983 A | 3/2000 | Benner |
| 6,059,081 A | 5/2000 | Patterson et al. |
| 6,223,871 B1 * | 5/2001 | Steffen ....................... 191/12.4 |
| 6,273,225 B1 * | 8/2001 | Park ....................... 191/12.2 R |
| 6,299,095 B1 * | 10/2001 | Murfin ......................... 242/395 |
| 6,433,274 B1 | 8/2002 | Doss et al. |
| 6,623,294 B2 * | 9/2003 | Tse et al. ..................... 439/501 |
| 2002/0100652 A1 | 8/2002 | Loyd |

FOREIGN PATENT DOCUMENTS

| | | |
|---|---|---|
| CA | 1237469 | 5/1988 |
| JP | 2002-324406 | * 11/2002 |

* cited by examiner

Primary Examiner—Mark T. Le
(74) Attorney, Agent, or Firm—Richard C. Litman

(57) ABSTRACT

A portable light reel system holding electro-luminescent (EL) wire and self-contained electronics, providing a stand-alone and self-contained light reel. The rotatably mounted cylindrical hub about which the EL wire is wound accommodates a battery and inverter. A waterproof switch is operative to impress a high frequency A.C. voltage upon the EL wire providing an "ON" state or a "BLINKING" state. An external power connector is provided the means for charging the batteries as well as supplying power to the inverter.

17 Claims, 5 Drawing Sheets

PORTABLE LIGHT REEL SYSTEM

CROSS-REFERENCE TO RELATED APPLICATION

This application claims the benefit of U.S. Provisional Patent Application Serial No. 60/422,718, filed Oct. 31, 2002.

BACKGROUND OF THE INVENTION

1. Field of the Invention

The present invention relates generally to storage reels for electrical wire. More specifically, the present invention is a portable self-contained light reel that holds electroluminescent (EL) wire and houses a power supply for the wire.

2. Description of the Related Art

Portable reels storing strings of lights are often used for decorative purposes during holidays for decorating both the interior and exterior of houses. They also serve a utilitarian purpose when used by law enforcement and other emergency action personnel for cordoning off or otherwise illuminating a specific area.

In the most basic embodiment of light reels known in the related art, a string of discrete, wire-mounted lights is wound around a storage reel, the reel being operative to unwind the string of lights from the reel to a desired length. An electric plug disposed on one end of the string is inserted into a source of electricity.

U.S. Pat. No. 5,695,148, issued to K. R. Christensen in 1997, discloses a light string storage reel comprising at least one reel including a center section and first and second side sections, the center section having an essentially hollow interior for storage of the lights. U.S. Pat. No. 6,299,095, issued to M. J. Murfin in 2001, discloses a storage device for light strands, which includes a hollow housing having a rotatably mounted shaft. A hand crank is rotatably mounted to the sidewall of the housing and is attached to the shaft for selectively rotating the shaft to wind a light strand around the shaft.

U.S. Pat. No. 5,957,401, issued to P. S. O'Donnell in 1999, discloses a hand reel storage device for a holiday light string, having an elongated cord, a plurality of light sockets with light bulbs, a plug on a first end and an outlet on a second end.

Reels for storing and dispensing wire capable of conducting electricity are not limited to light strings. Canadian Patent No. 1,237,469, discloses a reel for electric fence wire in which the hub or support for the reel accommodates an electric fence energizer device which provides a high voltage impulse to the electric fence. The hub may also accommodate batteries for supplying power to the energizer device.

Furthermore, U.S. Pat. No. 6,433,279, issued to Doss et al. in 2002, discloses two juxtaposed reels which retract an output power plug cable and an input power cable connected to an accessory power input plug.

In addition, U.S. patent application Ser. No. 2002/0100652, issued to T. G. Loyd in 2002 discloses a system for supplying power to a marine vessel that comprises at least one battery charger device, at least one battery and at least one retractable cord device. The battery charger is connected to the battery and adapted to transmit voltage to the battery. The retractable cord device is connected to the battery charger and is adapted to transmit voltage to the battery charger.

The more prevalent use of wire storage reels is for storing and dispensing electric power cords, some with automatic retraction mechanisms and some without. A brief list of U.S. Patents in the field of reels for storing and distributing electrically conducting cable includes: U.S. Pat. Nos. 3,835,267, 3,837,448, 4,143,746, 4,244,536, 4,284,180, 4,721,833, 6,035,983, and 6,059,081.

None of the above inventions and patents, taken either singly or in combination, is seen to describe the instant invention as claimed. Thus, a portable light reel system solving the aforementioned problems is desired.

SUMMARY OF THE INVENTION

The present invention is a portable light reel system for storing, dispensing and illuminating EL wire. EL wire is an electronic component that can only be activated by a voltage driver. The brightness intensity level depends on the voltage and frequency applied to it. The higher the voltage and frequency, the brighter the EL wire illuminates. The present invention utilizes a DC to AC inverter designed to generate a certain voltage and frequency, optimized for a specific length of EL wire.

The system has a housing containing a rotatably mounted cylindrical hub around which the wire is wound. The cylindrical hub is hollow, waterproof, and is adapted to accommodate a battery and the DC to AC inverter. A switch disposed on the hub selectively connects the output of the inverter to the EL wire. An external power connector mounted on the hub is provided for recharging the battery and provides an alternate way of supplying power to the inverter.

Accordingly, it is a principal object of the invention to provide a lightweight, low profile structure that contains a plastic light reel which holds EL wire and which contains a power supply for the EL wire, thereby providing a stand-alone and self-contained, portable light reel.

It is another object of the invention to provide a portable light reel, which can control the "on-off" rate at which the EL wire is illuminated.

Still another object of the invention is to provide a portable light reel on which EL wire can be easily stored, unwound and rewound.

Another object of the invention is to provide a light reel that holds EL wire, which can be used for lighting when no ac mains power is available.

Still another object of the invention is to provide a portable light reel for EL wire that can be used emergency purposes, such as landing lights for helicopters or fixed-wing aircraft, marking crime scenes, firefighting and police operations.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
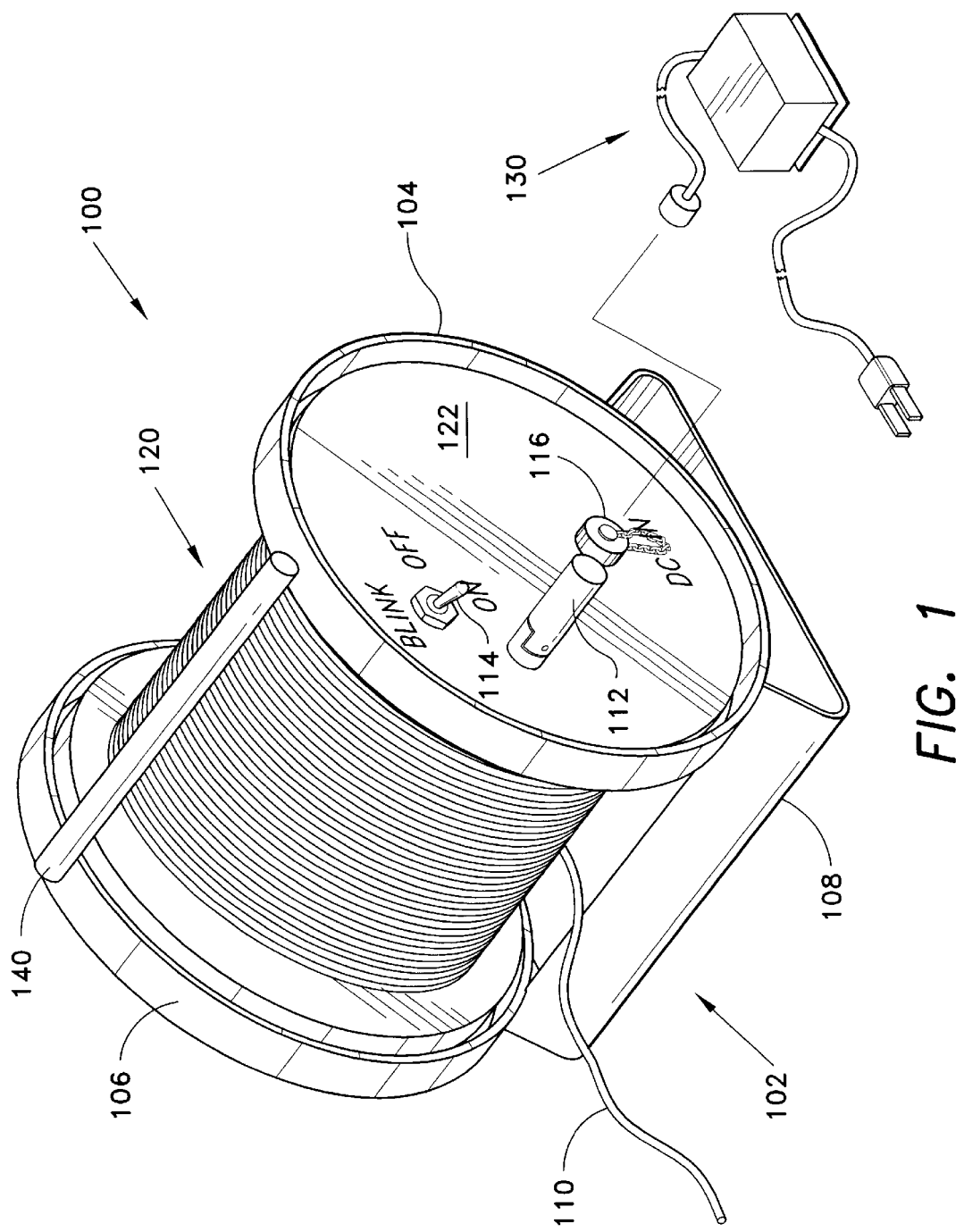
FIG. 1 an environmental, perspective view of a portable light reel system according to the present invention with an input connector for charging the battery and illuminating the EL wire from an external DC power source.

The present invention is a portable light reel 100, as generally shown in FIGS. 1–4. The light reel 100 is composed of a cylindrical reel 120 mounted in a support structure 102, within which the reel 120 may be rotated by means of a folding handle 112, for the purpose of paying out or rewinding electro-luminescent (EL) wire 110.

The support structure 102 may be fabricated from aluminum, plastic, or another suitable lightweight material, and has a base 108 with a generally rectangular, flat surface and two circular support members 104, 106 arising from opposite sides of the base 108. A handle 140 located at the top of the support structure 102 and extending between circular support members 104,106 provides a convenient means of carrying the unit The reel 120 is molded from lightweight plastic, or may be constructed from aluminum or another lightweight material, and forms a hollow cylinder having molded flanges 322, 324 on either end of the cylinder for retaining the wire 110 on the reel 120. A honeycomb lattice 330 provides structurally integrity for the flanges 322, 324, while providing a more lightweight structure than solid flanges.

A distal end cover 310, and a proximal end cover 122, are adapted to provide a waterproof seal on either end of the reel 120. The waterproof seal may be achieved through the use of one of several methods, or a combination of methods, which include waterproof sealing cement and/or a flexible waterproof gasket between the end cover and the reel.

Figure 3:
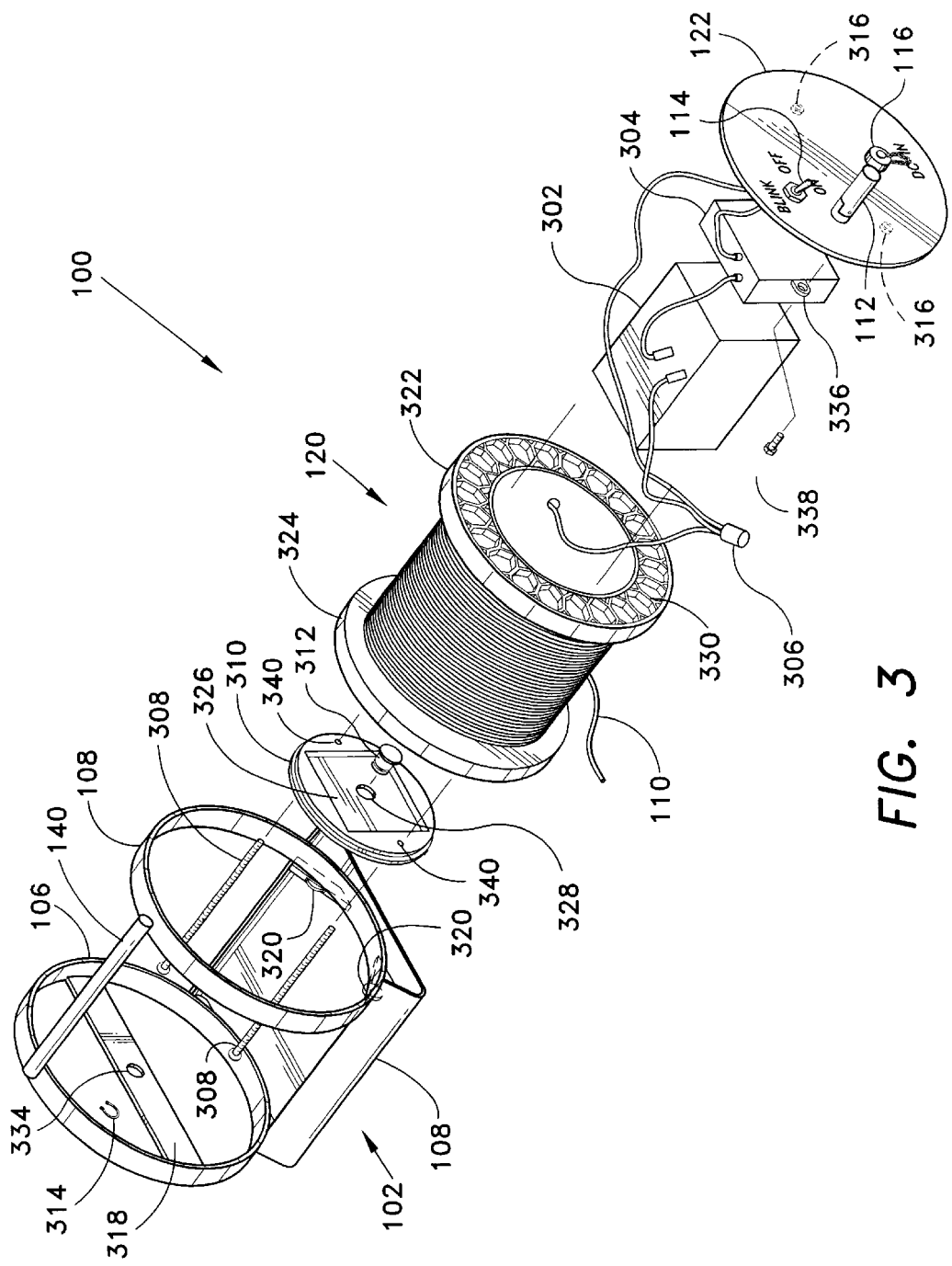
FIG. 3 is an exploded perspective view of the embodiment of FIG. 1.
Figure 4:
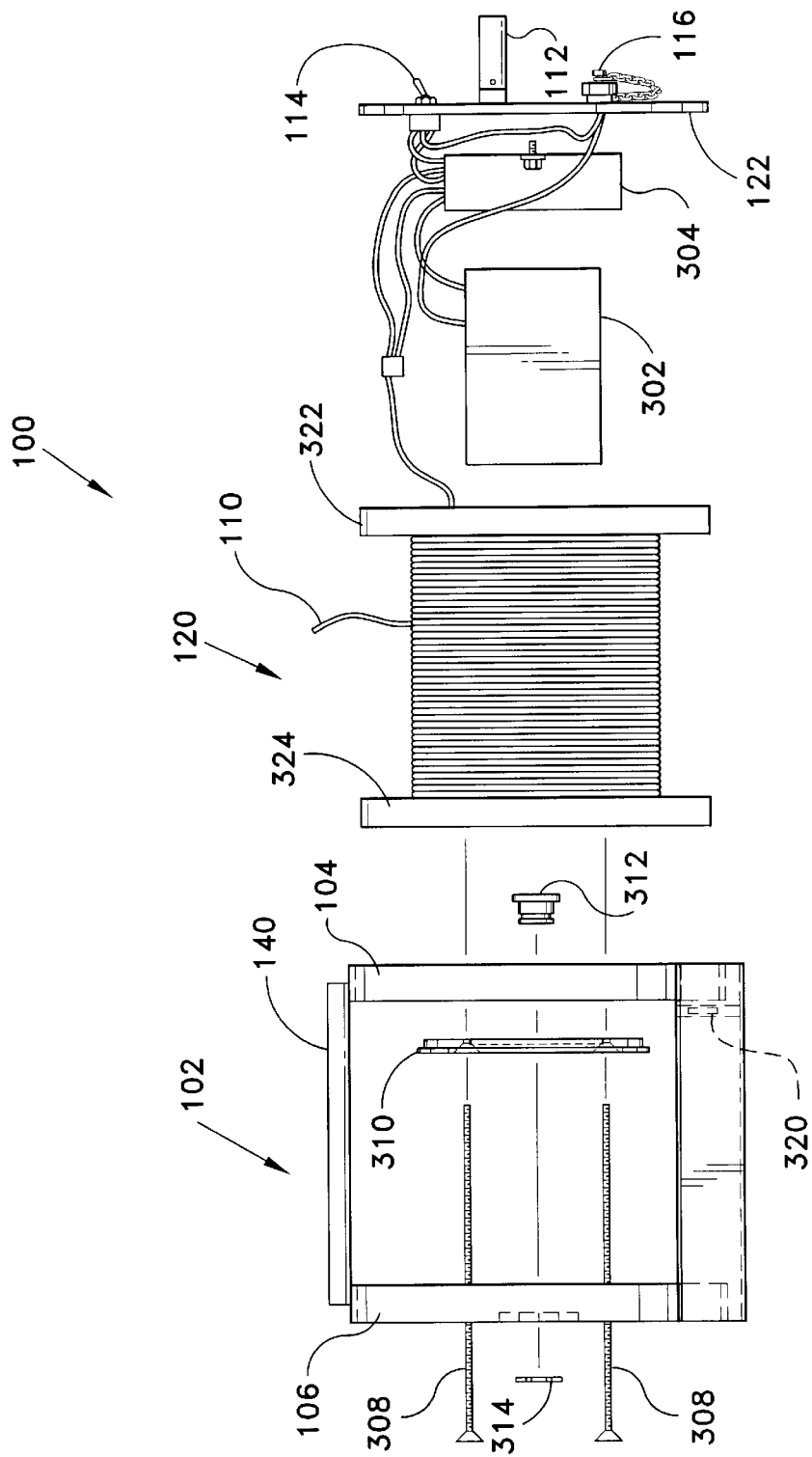
FIG. 4 is an exploded side view of the embodiment of FIG. 1.

The reel 120 rotates within the cavity formed by the circular support members 104, 106. As shown in FIG. 3, circular support member 106 has a horizontal support member, such as strap or bar 318, extending across the diameter of the support member 106. Bar 318 has a hole 334 defined therein. An axle bolt 312 passes through holes 328, 334 in the distal end cover 310 and bar 318, respectively, and is secured by retaining ring 314, which clips into a groove defined in the end of axle bolt 312, thereby rotatably mounting one end of the reel 120 to support member 106. Two rollers 320, made of a friction reducing material such as nylon, are mounted to the bottom of the proximal circular support structure 104. The proximal end flange 322 defines a rim which bears on rollers 320, so that when handle 112 is cranked, the proximal end flange 322 rotates on rollers 320, while the distal end rotates about axle bolt 312. The inner diameter of the circular support members 104, 106 and the outer diameter of the reel flanges 322, 324 are dimensioned to allow the reel 120 to rotate freely without excessive horizontal or vertical deflection.

The hollow interior of the reel 120 accommodates a twelve volt rechargeable battery 302 and a DC to AC inverter 304. The battery 302 may be of standard lead acid construction, or may be of lithium ion composition, thereby achieving lighter weight and greater output power. The input voltage of the inverter 304 is approximately twelve volts, and the output voltage and frequency of the inverter is predetermined to best illuminate the length of EL wire 110 disposed on the reel 120. Preferably the inverter 304 in the present invention supplies a voltage of approximately 90 VAC at 1800 Hz. to the EL wire 110. The electrical connection between the battery 302 and inverter 304 is explained in detail below.

One end of the battery 302 is received and supported by a recess 326 disposed in the inner surface of the distal end cover, 310. The proximal end of the battery 302 is adhesively fastened to one side of the inverter 304, the inverter 304 being fastened to the inner surface of the proximal end cover 122 by means of a pair of screws 338, passing through lugs 336 extending from the inverter 304 and secured by captive nuts 316 disposed on the inner surface of the end cover 122. A pair of elongated threaded bolts 308 tightly sandwich together the reel 120, battery 302, and inverter 304 between the end covers 310, 122. The bolts 308 pass through apertures 340 cut in the distal end cap 310 and are secured by captive nuts 316 disposed in the proximal end cap 122.

The EL wire 110 is comprised of an inner conductor coated with luminescent material over which a pair of outer conductors is helically wound. A plastic sheath of clear or colored material protects the wire from damage, as well as providing a means for altering the color of the light. One end of the EL wire 110 passes through a silicon gasket in the cylindrical surface of the reel 120, maintaining the waterproof integrity of the hollow interior. A wire connector 306 electrical connects the three conductors of the EL wire 110 to the output of the inverter 304. A three-position double pole, double throw waterproof switch 114 disposed on the outer surface of the proximal end cover 122 selectively controls the output of the inverter 304.

Figure 5:
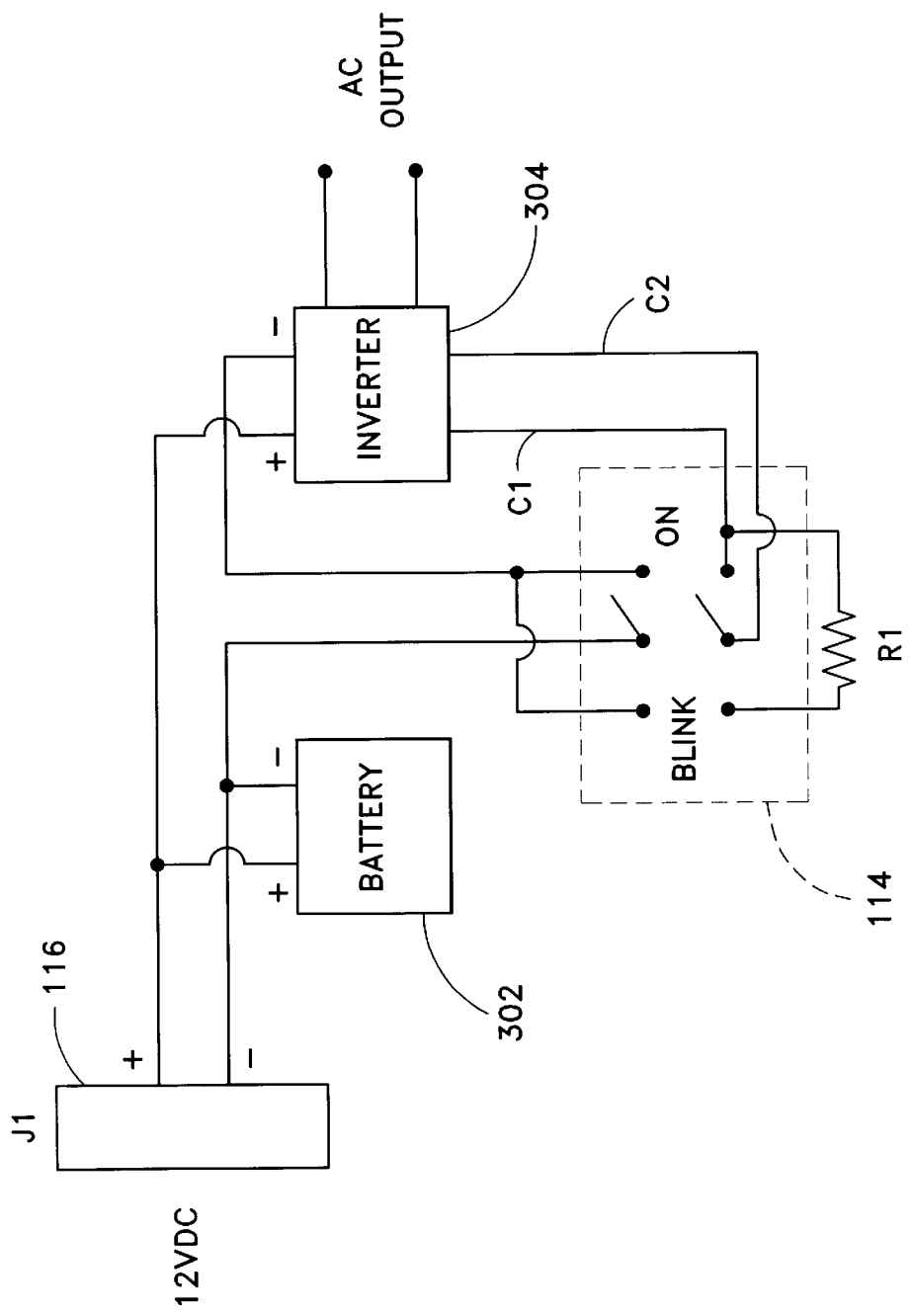
FIG. 5 is a schematic diagram of the embodiment of FIG. 1.

The schematic drawing of FIG. 5 best describes the operation of the electrical components of the portable light reel 100. In the "OFF" position, shown in the figure, the inverter 304 is disconnected from the battery 302. The remaining two switch positions are operative to cause the EL wire 110 to illuminate continuously with a steady glow, or to blink at a predetermined rate. One pole of the switch 114 is operative to connect the negative or ground terminal of the battery 302 to one input terminal of the inverter 304. The positive terminal of the battery 302 is always connected to the other input terminal of the inverter 304 are connected together. An external power input connector 116 is provided for charging the battery 302, as well providing an alternate source of power for driving the inverter 304 directly from an A.C. source, with the conversion from A.C. to D.C. being performed by a transformer external to the reel 120, as shown in FIG. 1.

The blinking rate is determined by the value of a resistor R1 impressed across inverter control leads C1 and C2. When the switch 114 is in the "ON" state, there is an effective short between control leads C1 and C2. When the switch is in the "BLINK" position, resistor R1 is switched across control leads C1 and C2.

The aforementioned embodiment of the present invention 100 is designed for emergency and military personnel and as such was designed with a 12 VDC external input power connector 116. As shown in FIG. 1, the output of an AC to DC converter 130, such as a wall charger, may be connected to the external DC power input connector 116 to charge the battery 302 and drive the inverter 304.

Figure 2:
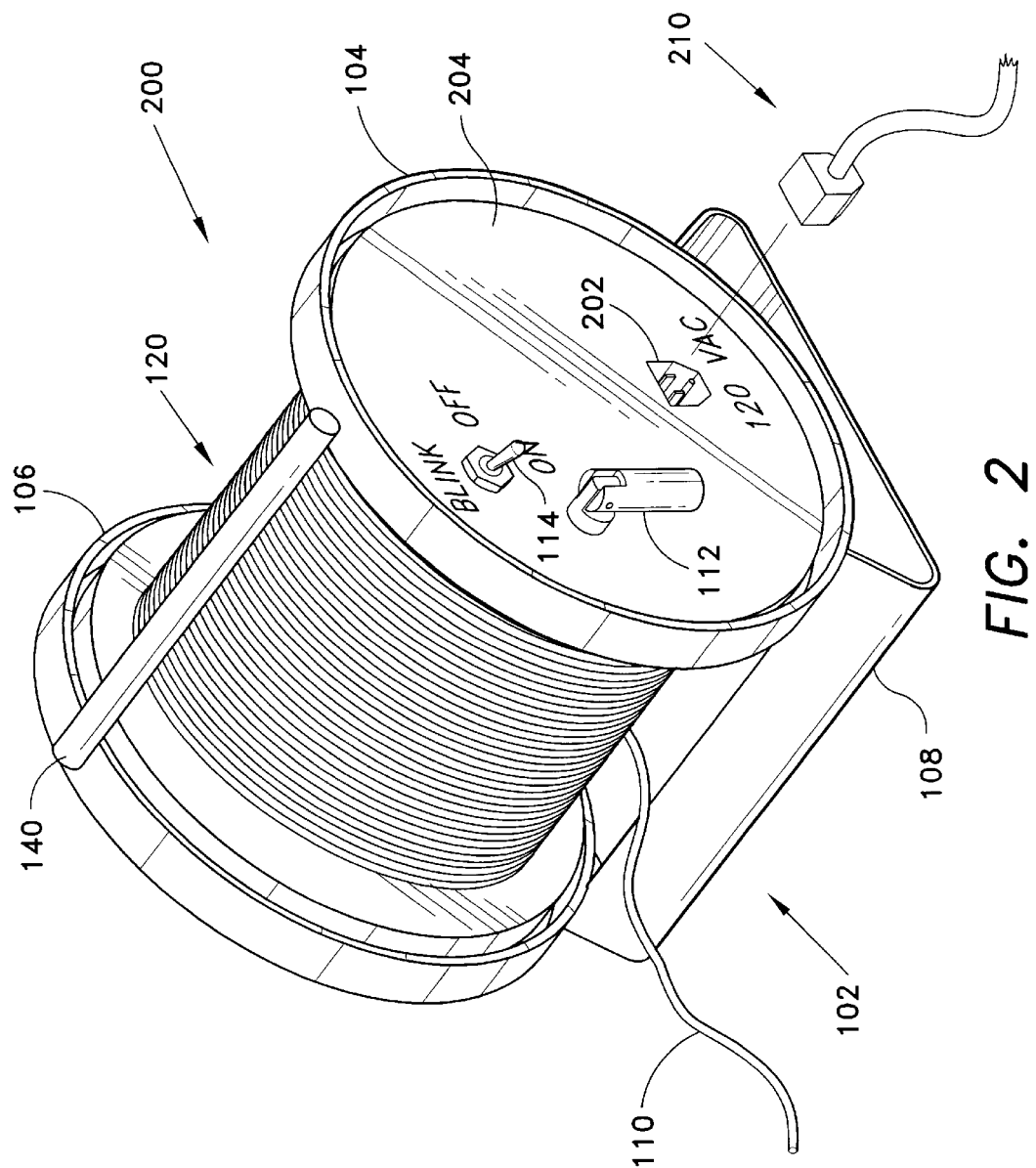
FIG. 2 is an environmental, perspective view of an alternative embodiment of the portable light reel system in which the external power is provided by 120 VAC.

FIG. 2 discloses an alternative embodiment 200 in which the external power is provided by a 120 VAC power cable and plug 210 inserted into a recessed male power connector 202. A battery charger (not shown) contained within the reel and electrically connected to the battery 302 and inverter 304 operates to convert the 120 VAC to 12 VDC to charge the battery 302 and power the inverter 304.

Using an alternative inverter with different output power and frequency characteristics one may vary the brightness of the illuminated EL wire. An additional dimmer or toggle switch (not shown) may optionally be provided on the end cover for controlling the brightness of the EL wire.

All openings on the end cover 122 for the power switch 114 and external power connector 116 are provided with waterproof gaskets (not shown) or other means for maintaining the waterproof integrity of the hollow compartment within the reel 120.

It is to be understood that the present invention is not limited to the embodiments described above, but encompasses any and all embodiments within the scope of the following claims.

I claim:

1. A portable light reel system, comprising:
   a housing;
   a reel rotatably supported on said housing, the reel being hollow and defining an interior chamber;
   a roll of electro-luminescent wire wound around the reel;
   a DC to AC power inverter mounted within the interior chamber, the inverter being electrically connected to the electro-luminescent wire; and
   a connector means for connecting said inverter to a source of electrical power.

2. The portable light reel system of claim 1, further comprising a switch electrically connected to said power inverter for controlling power applied to the electro-luminescent wire.

3. The portable light reel system of claim 1, further comprising a three-position, double pole, double throw switch electrically connected to said power inverter, the switch having an "off" position in which electrical power is disconnected from the electro-luminescent wire, an "on" position in which electrical power is connected to the electro-luminescent wire at a voltage and frequency providing constant illumination while in the "on" position, and a third position in which electrical power is supplied at a voltage and frequency providing blinking illumination.

4. The portable light reel system of claim 1, further comprising a handle attached to said reel for rotating said reel.

5. The portable light reel system of claim 1, further comprising at least one battery disposed within the interior chamber of said reel, the battery being electrically connected to said inverter.

6. The portable light reel system of claim 1, wherein said inverter has an input voltage of about 12 volts DC, and an output voltage of approximately 90 VAC at 1800 Hz.

7. The portable light reel system of claim 1, wherein said housing and said reel are manufactured from lightweight material.

8. The portable light reel system of claim 1, further comprising means for waterproofing the interior chamber of said reel.

9. The portable light reel system according to claim 1, wherein said housing comprises:
   a rectangular base;
   a first circular support arising from said base, the first circular support having a bar extending diametrically across the support, the bar having a mounting hole defined therein;
   a second circular support arising from said base parallel to the first circular support, the second circular support having a plurality of rollers mounted thereon; and
   wherein said reel has a first end having an axle bolt extending therefrom, the axle bolt being rotatably mounted in the mounting hole defined in the first circular support; and
   said reel has a second end rotatably supported on said plurality of rollers.

10. A portable light reel system, comprising:
    a housing;
    a reel rotatably supported on said housing, the reel being hollow and defining an interior chamber, the reel having a pair of removable end plates disposed at opposite ends of the interior chamber, the reel having a roll of electro-luminescent wire wound therearound;
    a DC to AC power inverter mounted within the interior chamber, the inverter having a pair of input terminals and a pair of output terminals, the output terminals connected to said electro-luminescent wire;
    a battery disposed in the interior chamber and electrically connected to the input terminals of the inverter; and
    a switch disposed on one of said end plates, the switch being electrically connected between said battery and said inverter.

11. The portable light reel system according to claim 10, wherein said housing includes:
    a rectangular base;
    a first circular support arising from said base, the first circular support having a bar extending diametrically across the support, the bar having a mounting hole defined therein;
    a second circular support arising from said base parallel to the first circular support, the second circular support having a plurality of rollers mounted thereon; and
    wherein said reel has a first end having an axle bolt extending therefrom, the axle bolt being rotatably mounted in the mounting hole defined in the first circular support; and said reel has a second end rotatably supported on said plurality of rollers.

12. The portable light reel system according to claim 11, wherein said reel further comprises a folding crank handle attached to one of said end plates.

13. The portable light reel system according to claim 10, wherein said battery is a rechargeable battery, said reel further comprising a jack electrically connected to said battery and to the input terminals of said inverter, whereby an external DC power source may be connected to said jack to recharge said battery and apply electrical power to said inverter.

14. The portable light reel system according to claim 10, further comprising:
    a jack disposed on said reel, said jack capable of being connected to an electrical power cord attached to an A.C. power main; and
    an AC to DC converter electrically connected to said jack, the converter being disposed in the interior chamber and being electrically connected to the input terminals of said inverter.

15. The portable light reel system according to claim 10, wherein said inverter accepts a twelve-volt DC input and produces an output of about ninety volts AC at 1800 Hz.

16. The portable light reel system according to claim 10, wherein said switch comprises a three-position, double pole, double throw switch electrically connected to said power inverter, the switch having an "off" position in which electrical power is disconnected from the electro-luminescent wire, an "on" position in which electrical power is connected to the electro-luminescent wire at a voltage and frequency providing constant illumination while in the "on" position, and a third position in which electrical power is supplied at a voltage and frequency providing blinking illumination.

17. The portable light reel system according to claim 16, wherein one the poles of said switch is an inverter pole connected to a first one of the output terminals of said inverter, the switch having:

a first throw directly connected to a second one of the output terminals of said inverter; and a second throw, the system further comprising a resistor connected between the second throw and the second one of the inverter output terminals;

wherein the inverter pole contacts the first throw in the "on" position and contacts the second throw in the "blink" position.

\* \* \* \* \*